United States Patent
Pawlowski

(10) Patent No.: US 9,712,688 B2
(45) Date of Patent: Jul. 18, 2017

(54) WIRELESS ADAPTER AND METHOD FOR COMMUNICATION WITH DIGITAL CAMERA

(71) Applicant: David James Pawlowski, Pinedale, WY (US)

(72) Inventor: David James Pawlowski, Pinedale, WY (US)

(73) Assignee: Cam Ranger LLC, Pinedale, WY (US)

( * ) Notice: Subject to any disclaimer, the term of this patent is extended or adjusted under 35 U.S.C. 154(b) by 0 days.

(21) Appl. No.: 14/217,463

(22) Filed: Mar. 17, 2014

(65) Prior Publication Data

US 2015/0264202 A1   Sep. 17, 2015
US 2016/0142562 A9   May 19, 2016

Related U.S. Application Data

(60) Provisional application No. 61/802,283, filed on Mar. 15, 2013.

(51) Int. Cl.
*H04N 5/232* (2006.01)
*H04N 1/00* (2006.01)

(52) U.S. Cl.
CPC ..... *H04N 1/00106* (2013.01); *H04N 1/00315* (2013.01); *H04N 5/232* (2013.01); *H04N 5/23203* (2013.01); *H04N 5/23216* (2013.01); *H04N 5/23293* (2013.01); *H04N 2201/0043* (2013.01); *H04N 2201/0055* (2013.01)

(58) Field of Classification Search
CPC ........... H04N 21/4223; H04N 1/00204; H04N 1/00251; H04N 5/23216; H04N 5/23206
USPC ....... 348/207.1, 207.11, 211.99, 211.1–211.3
See application file for complete search history.

(56) References Cited

U.S. PATENT DOCUMENTS

| | | | | |
|---|---|---|---|---|
| 5,528,337 A | * | 6/1996 | Kawano | G03B 17/38 396/502 |
| 6,750,902 B1 | * | 6/2004 | Steinberg | G03B 7/091 348/207.1 |
| 9,036,016 B2 | * | 5/2015 | Brockway, III | H04N 1/00315 348/61 |
| 2007/0040894 A1 | * | 2/2007 | Kikugawa | 348/14.01 |
| 2008/0014482 A1 | * | 1/2008 | Yamamiya | 429/19 |
| 2008/0192129 A1 | * | 8/2008 | Walker | G11B 27/034 348/231.2 |
| 2009/0040331 A1 | * | 2/2009 | Kitagawa | 348/222.1 |
| 2010/0289937 A1 | * | 11/2010 | Hada | 348/333.01 |
| 2011/0043663 A1 | * | 2/2011 | Tsuchiya | H04N 5/232 348/240.3 |
| 2011/0310257 A1 | * | 12/2011 | Armstrong | 348/207.1 |
| 2012/0008023 A1 | * | 1/2012 | Wajs | H04N 1/409 348/273 |
| 2012/0120261 A1 | * | 5/2012 | Mehra et al. | 348/207.11 |
| 2012/0224031 A1 | * | 9/2012 | Yamanaka | G03B 35/04 348/47 |
| 2013/0113944 A1 | * | 5/2013 | Fukushima | 348/207.1 |

(Continued)

*Primary Examiner* — Kelly L Jerabek

(57) ABSTRACT

The present invention provides a camera accessory that connects to a camera. The camera accessory includes a wireless antenna and can communicate on a wireless local area network with a separate wireless enabled device. The camera accessory controls and interacts with a camera through Picture Transfer Protocol. According to some embodiments the separate wireless enabled device is a smart phone, tablet or computer.

19 Claims, 3 Drawing Sheets

(56) References Cited

U.S. PATENT DOCUMENTS

2013/0235222 A1* 9/2013 Karn ................. H04N 5/23203
348/211.2

* cited by examiner

WIRELESS ADAPTER AND METHOD FOR COMMUNICATION WITH DIGITAL CAMERA

CROSS-REFERENCE TO RELATED APPLICATION

This application is a continuation of U.S. patent application No. 61/802,283, filed Mar. 15, 2013.

BACKGROUND

This invention relates generally to digital cameras and, more precisely, to wireless adapters to enable control of and feedback from digital cameras from remote wirelessly enabled devices.

Digital cameras, including digital single lens reflex (DSLR) cameras and digital video cameras, are pervasive in the field of photography and videography. Digital cameras provide a large number of features including near immediate feedback and viewing, and a large number of settings and adjustments that can be made. However, it is not always convenient, efficient, or practical to physically control the camera. The camera may be located out of reach such as on a pole, jib, boom, or in a building's rafters and would be impractical to be physically co-located. Or the camera may be positioned low to ground and looking through the viewfinder or manipulating the controls could be difficult. Remote control can also advantageous when the photographer would like to be in the photograph or when being co-located with the camera could be dangerous such as near animals or in inclement weather. A means of remotely controlling a digital camera can provide great assistance to a photographer. Similarly, it may be advantageous for a photographer to transmit data, images, or video back to other interested parties in a separate location, which could also allow immediate editing or further transfer or images or video. Remotely transmitting images and video can also allow remote and/or backup storage.

Existing solutions for remote control of digital cameras have drawbacks. Simplistic solutions exist, but are more limited in their application to controls such as triggering an image or automatically transferring images, and do not encompass more complete control due to limitations in each approach. Lastly, more feature complete solutions exist but are either hardware built into the camera or dedicated solely for the use of a single or very small number of camera models.

SUMMARY

Embodiments of the present invention relate to a wireless adapter and system capable of controlling a digital camera from one or more remote wirelessly enabled devices. In one embodiment, the wireless adapter is contained within a housing and is detachably connected to the camera creating an electrical interface between the camera and adapter. The wireless adapter contains a transceiver to wirelessly communicate with remote wireless enabled device(s). These remote devices can thusly control the digital camera wirelessly through the wireless adapter as well as receive feedback and data from said camera.

The remote device aids in composing the photograph, as many remote devices have screens much larger than the screen on the back of the camera it is often easier to compose the photo. The associated software on the remote device can be configured to show grid lines, aspect ratios, focus peaking, shadows and highlights, focus points, detailed focus, histogram, etc.

DETAILED DESCRIPTION

Referring now to FIGS. 1 through 6, the invention of a wireless adapter and camera control system will now be described. It is noted that the invention may be embodied in many different forms and should not be limited solely to the embodiment listed herein.

Figure 1:
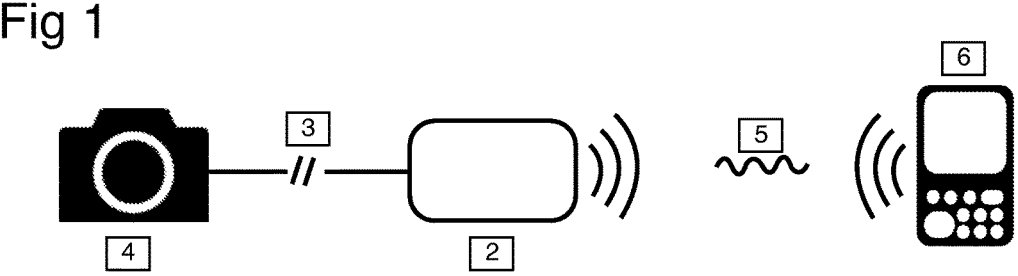
FIG. 1: Overview of camera connected with wireless adapter and wireless transmitting data to and from a remote device.

FIG. 1 illustrates an overview of the wireless adapter system. The wireless adapter 2 is detachably connected 3 to a digital camera 4 and creates an electrical interface enabling the wireless adapter to be capable of controlling and receiving feedback from said camera. The wireless adapter is capable of creating and/or joining a wireless network 5. This wireless network may then be used by a remote wirelessly enabled device 6 to communicate with said wireless adapter.

The wireless network 5 may be a wide area wireless network (WWAN) such as a WiMAX, GSM, or CDMA network or a wireless local area network (WLAN) such as WiFi. The wireless adapter may optionally create a WLAN network, such as through the creation of an ad-hoc WiFi network. This wireless network may be joined by remote device 6. Optionally, additional wirelessly enabled devices may join the network, such as a computer, printer, print server, wireless bridge, or additional wirelessly enabled devices. The wireless network may optionally bridge to other wireless or wired network to expand range, capability and connectivity.

The remote device 6 may be any item satisfying the requirements of being able to be connect to a wireless network and communicate with the wireless adapter. Optionally, some additional capability could be possible such being capable of displaying graphic and/or textual information such as pictures, live video feed, and camera data and settings. The remote device interface may also be capable of permitting the user to interact in ways such as making configuration changes to the camera, initiating camera focusing, initiating the camera to take a picture, or starting or stopping video recording. Additional capabilities could include the ability to save or print incoming data. These are just a subset of the possible capabilities and controls and are listed here to describe the remote device interface. The remote device may for example be a smartphone, tablet, computer, wireless enabled hard drive, or other embodiment meeting the listed requirements and associated applications and programs. The wireless device should contain software to enable it to be able comply with the requirements of it's ability to send, receive, display, and/or issue commands. It is advantageous to have a custom application or program on the wirelessly enabled remote device to communicate with the wireless adapter.

The wireless adapter 2 and camera 4 are detachably connected with connector 3. In this embodiment that connector is comprised of a cable inserted into appropriate connection points on the wireless adapter and camera respectively. The cable may consist of any appropriate connection type or protocol, including Firewire, USB, Cat5, etc, or any combination thereof. The connector provides an electrical interface between the wireless adapter and camera enabling communication between said wireless adapter and camera over some appropriate protocol. A common protocol could, for example, be the Picture Transfer Protocol (PTP) over a USB connection. However, any number of appropriate protocols and connection types may be used. A USB connection with the Picture Transfer Protocol is advantageous for the following reasons: digital cameras commonly have USB connectors regardless of camera brand or model; digital cameras commonly implement the Picture Transfer Protocol; USB is a common embedded system interface making it a possibly preferred choice for the wireless adapter's interface; consumers are familiar with the use and operation of USB and USB connectors. A shutter release connector could also be used by itself or in conjunction with other attachment connectors and protocols. The wireless adaptor is a universal system that can be configured for use with any camera containing the appropriate physical connection port and protocol interface.

Figure 2:
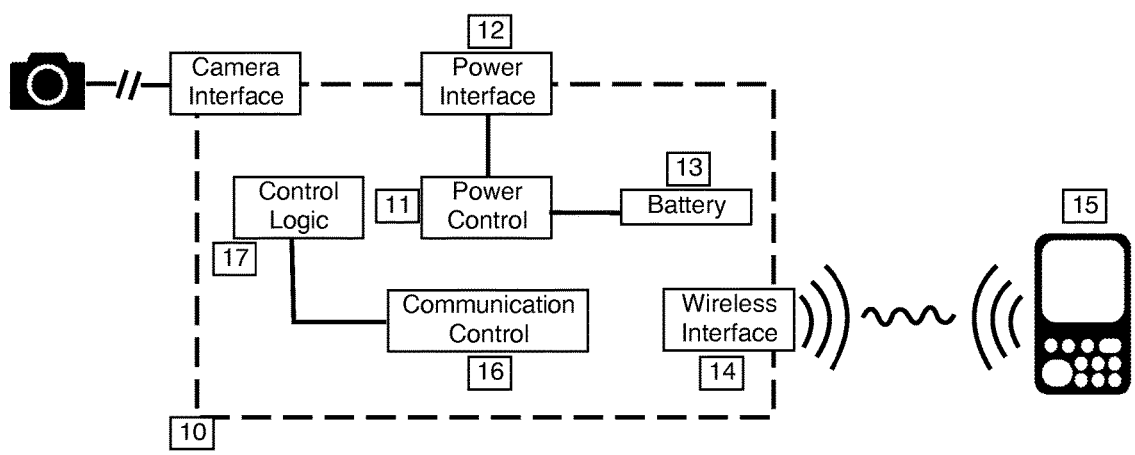
FIG. 2: Logical block diagram of the wireless adaptor.

FIG. 2 illustrates an embodiment of the wireless adapter 10 as a block diagram to illustrate core components. It is understood that this block diagram is a simplification of the system and only one of many possible arrangements. A power control module 11 consists of electronics and software necessary to interface with a power interface 12 and battery 13. The wireless adaptor may be powered by the power interface 12 providing DC or AC power or by means of the battery 13. The power control module in conjunction with the power interface can also recharge the battery. The wireless interface 14, most commonly an antenna and appropriate control circuitry and logic, enables a wireless communication link between the wireless adaptor and a wireless enabled remote device 15. The wireless communication link may be between one or more wireless enabled devices. The communication control module 16 interfaces with the wireless interface and provides appropriate command and control such as monitoring, maintaining, and creating wireless connections, initiating or receiving wireless transmissions, and providing access to the wireless interface for the control logic module 17. The camera interface 18 provides a physical link 19 from the wireless adapter 10 to the camera 20. As discussed this link can be through any number of physical interfaces and protocols: USB, FireWire, Cat5, or other common interface and protocol. The control logic module can serve as both a simple pass through for transferring signals and data between the communication control module and camera interface as well as a more advanced controller capable of initiating its own command, control, and feedback through the camera interface. In most instances the wireless adapter having its own battery is advantageous as the adaptor provides it's own power rather than using the camera's battery. It is preferable for the battery to be rechargeable and replaceable. However, having a non-replaceable battery is also an option. It is also possible to configure the wireless adaptor to power itself using the power from the camera, as this aids in decreasing the size of the adapter.

Figure 3:
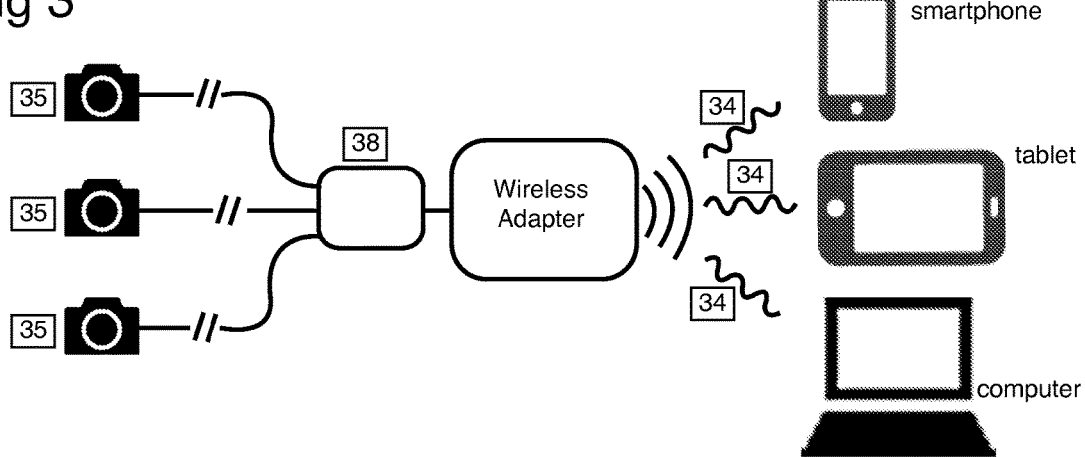
FIG. 3: A different embodiment with multiple cameras wireless connected to multiple devices.

FIG. 3 illustrates an embodiment with multiple remote devices and cameras. A smartphone 31, tablet 32, and computer 33 are all wireless communicating 34 with the wireless adapter 30. Other devices could also be connected such as a printer, wireless hard drive, PDA. The wireless adapter 30 is detachably connected to multiple cameras 35, 36, as well as a external hard drive storage device 37 through a hub 38 or some other suitable mechanism. In this embodiment, the wireless adapter can be configured to enable communication between any remote wireless device and detachably connected camera. Some of the resulting capabilities include, but are not limited to: a remote device controlling any single camera; a remote wireless device controlling any number of cameras including multiple in unison if so configured; feedback, data or images transmitted to a particular remote wireless device; and feedback, data or images transmitted to any number of remote wireless devices. The external storage device 37 could also be used to permit the transfer of images and video from the cameras 35, 36 either automatically or based on input from the remote wirelessly enabled devices 31, 32, 33.

Figure 4:
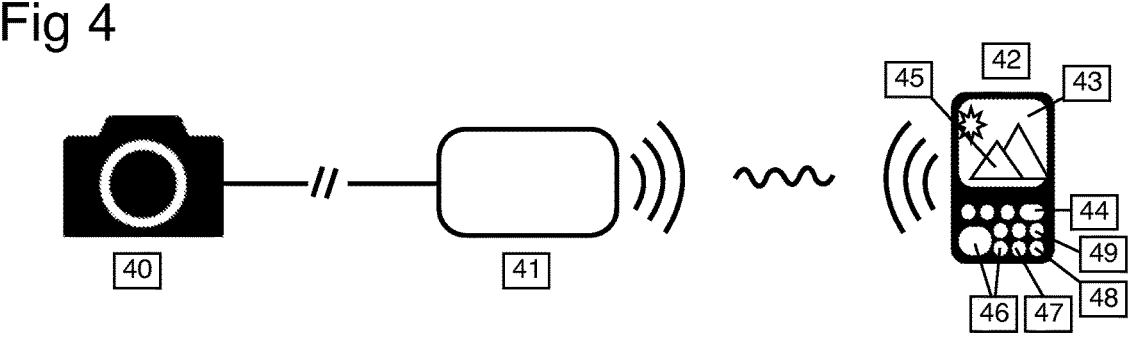
FIG. 4: A detailed drawing of the camera with wireless adapter and associated application on the remote device.

FIG. 4 demonstrates a possible configuration and usage. An operator with a remote wireless device 42 wirelessly connects to the wireless adapter 41 that is detachably connected to a camera 40. The remote wireless device may be comprised of a display 43 and some means of interaction, such as touch screen buttons 44, or separate physical buttons. Other configurations are also possible, such as only a display for presenting information and images or only controls for commanding the wireless adapter and no visual feedback mechanism. In the configuration in FIG. 4 an image 45 is displayed on the screen. This image could be a still image that was captured, a video stream, or live view stream of the camera's current field of view. A control section 46 provides status as well as control over camera parameters such as Shutter Speed, Aperture, ISO, etc. This is of course a subset of the possible camera settings and parameters that could be monitored and manipulated. Additional controls may also be present, such as the ability to trigger an image to be captured 47; start or stop streaming a live view of the cameras field of view 48; start or stop recording a video 49; and change focusing modes such as between automatic and manual focus.

Figure 5:
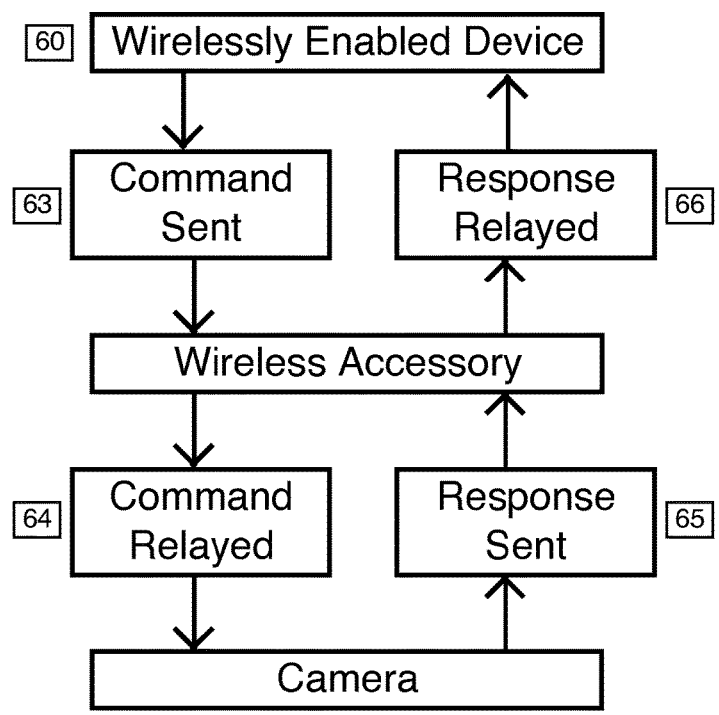
FIG. 5: Process flow of simplistic communications method.
Figure 6:
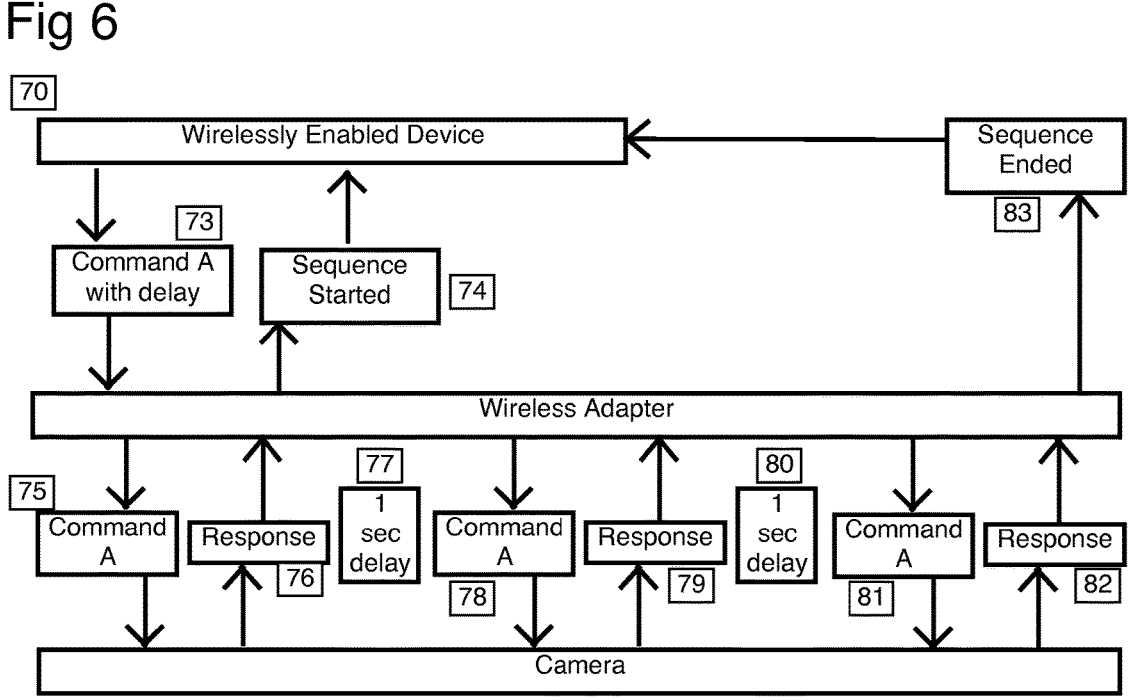
FIG. 6: Process flow of more complex communications method.

The physically and logical structure described thus far enables many possible methods of configuration and communication. FIG. 5 illustrates the control flow of a simple communication method. The wirelessly enabled device 60 transmits a message 63 to the wireless adapter 61. The wireless adapter transmits the message exactly as received 64 to the camera 62. Any responses received 65 from the camera 62 by the wireless adapter 61 are then transmitted back 66 to the wirelessly enabled remote device 60. In this configuration the wireless adapter acts as a direct link between the wireless device and camera.

In addition to the simplistic direct-link method described previously, the wireless adapter may be configured to perform more complex communication tasks. For example, in FIG. 6, the wirelessly enabled remote device 70 issues a command 73 to the wireless adapter 71 with in intent for it to be sent three times with a one second delay between each command. This intent could, for example, be communicated through additional headers fields added to the command. The wireless adapter can respond to the wirelessly enabled remote device that the sequence command was successfully received and initiated 74. The wireless adapter then begins the sequence by relaying the message 75 to the camera and receiving a response 76. This response may optionally be relayed to the wirelessly enabled remote device. After a one second delay 77 as specified by the initial command 73, this process of sending a command 78, 81, receiving a response 79, 82 and delaying 80 is repeated the appropriate number of times. After completing the sequence, the wireless adapter can inform the wirelessly enabled device that the sequence has terminated.

The wireless adapter may be configured in various physical forms as well as various attachment methods. The adapter may be a separate stand-alone device; integrated into or onto an existing item such as a tripod, tripod mount, camera flash unit, L-bracket, or other similar item; or may be physically detachably secured to the camera through means such as a male or female threaded adapter or screw, clip, strap, hot-shoe plate adapter, or any similar type means or any combination thereof. It should be noted that these forms and attachment methods are a subset of possible options and one skilled in the art would not be limited to these listed. Any items to aid in attachment may be detachably or fixedly secured and/or integrated with the wireless adapter. It should be noted that the wireless adapter is external to the camera.

The wireless adapter may be configured internal or external with additional items. The wireless adapter may, for example, be configured internal or external with a motorized control unit capable of various functions such as physically moving the camera in any direction or adjusting the angle of rotation about any given axis, thereby enabling pan, tilt, and rotation controls. A motorized control unit could also be used to physically move the camera's lens, such as to change the lens' zoom distance, or could be used to make physical adjustments to buttons, dials, or other controls located for example on the camera or lens. These items listed are a subset of the possible items that the wireless adapter may be configured with as well as a subset of the possible controls such configurations may offer.

The wireless adapter described allows a number of possible methods of use. One configuration could be a user directly interacting with a remote wirelessly enabled device, such as an iPad™, that is wirelessly communicating with the wireless adapter fixedly connected to a camera. In one possible method of use, the user could interact with buttons on the on the associated application on the iPad™ to command the wireless adapter to stream a live view video stream to then be displayed to the user on the iPad's™ screen. The exact method for turning on a live view stream varies by camera and manufacturer. The state-full knowledge could reside with either the iPad or the wireless adapter, but the process is essentially the same. The camera model and manufacturer must be determined through appropriate queries. Then depending on the model the appropriate commands must be taken, for example some models require only a specific camera parameter to be set before live view feed images can be retrieved, while other models require a camera parameter to be set as well as a specific command issued. In addition to simply the benefit of the video feed for feedback and composition, additional capabilities could be offered to the user. The user could touch on certain areas or objects within the live view feed, which would then automatically instruct the wireless adapter to command the camera to focus on the selected area. The user will then be able to see this focus adjustment take place in real time. Similarly to the process of turning on the live view feed, the touch focusing process must take specific actions based on the current camera model. In general terms the process involves commanding the camera to set the location of interest to the selected area and then perform a focus operation. However, the exact parameters and values used need to be determined based on prior information correlated with the current camera model. In addition to the touch focus method described here, the user could initiate an automatic focus adjusting and capture procedure known as focus stacking. Focus stacking is the process of acquiring images at multiple focal planes enabling the images to be later combined to achieve an enhanced depth of field. The user can configure this process through a number of methods. In one method the user can specify two focal planes on the iPad™ using the live view feed for feedback and then instruct the wireless adapter to capture a focus stack between those planes. Similarly the user could specify an initial focal plane on the iPad™ as well as specifying how many image captures to take and how large of a focus step to take between each capture. In either scenario the wireless adapter's task is to query the camera for its model and then using that information select the appropriate focus adjustment and capture commands. Using these specifically selected commands the wireless adapter can step through the process of applying focus adjustments and capturing images. It should be noted that the wireless adapter could perform this process autonomous from the iPad™ or be directly commanded by the iPad™ through the entire process. To more easily enable the user to determine focal planes, techniques such as focus peaking could be used. The iPad™ could use a contrast detection algorithm to determine and then outline areas within focus.

Building upon the previous configuration of a user directly interacting with an iPad™, the user can configure the wireless adapter to automate commands to the camera. For example the user can specify a series of image captures on the iPad™, such as indicating a initial start time or delay, and then either how many images to capture over a specific interval or how many images to capture and with how long of a delay between each image. In either case, this information can be transmitted to the wireless adapter, which can calculate how many shots to take, and with how long a delay between each shot. After waiting for any specified initial delay, the wireless adapter can command to camera to capture an image. The wireless adapter can then enter a cycle of waiting the specified intermediate delay between each subsequent image capture. The exact image capture commands sent by the wireless adapter can be determined by querying for the currently connected camera and selecting the appropriate commands based on the camera model. It should be noted that as described, the iPad™ no longer needs to remain in communication with the wireless adapter after the initial configuration of the wireless adapter, and the wireless adapter can continue its capture sequence autonomous from the iPad™. The iPad™ could, however, remain connected and directly command the wireless adapter for each capture if so desired.

Similarly to the previous method of capturing a sequence of images, the user could also configure on the iPad™ set or variable exposure adjustments to be made during the image capture sequence. In addition to an image capture, a camera property could be adjusted either between each capture or at specific intervals. The process to change a property involves determining the camera model and correlating the appropriate property command and value to set said property to. Similarly to the more simplistic image capture process, this image capture and property adjustment process could be performed on the wireless adapter autonomously from the iPad™ or driven directly by commands from the iPad™.

The camera with the wireless adaptor is also appropriate for photo booths. The remote device is used to trigger and/or view the photos while the wireless adaptor transmits and receives data and can optionally print the photos.

It is also noted that the wireless adapter may have a GPS receiver to tag images captured with location information or alternatively the wirelessly enabled remote device may provide location information to add information.

The invention claimed is:

1. An apparatus comprising a camera accessory that connects to a camera using an electrical interface, said camera accessory comprises a wireless antenna, power control module, communication control module, and control logic module, with said camera accessory able to communicate on a wireless local area network with a separate wireless enabled device, where said wireless enabled device is configured to query a camera and automatically determine and use commands and parameters necessary to initiate control and interact with, including changing and viewing camera settings, and receive feedback from, a camera through Picture Transfer Protocol (PTP), wherein control of said camera as well as feedback and data from said camera is comprised of Picture Transfer Protocol messages; said wireless enabled device being a smart phone, tablet or computer; has a specific program configured to be executed for use with said camera accessory; wherein said specific program includes a library for each camera that said camera accessory is compatible with wherein said library uses Picture Transfer Protocol messages for each camera wherein a camera model and manufacturer must be determined through queries; then commands are taken which are dependent on said camera model, wherein certain of said camera models require only a specific camera parameter to be set before live view feed images can be retrieved, while other of said camera models require a camera parameter to be set as well as a specific command issued before live view feed images can be retrieved.

2. The apparatus of claim 1 wherein said electrical interface comprises USB.

3. The apparatus of claim 2 further comprises a shutter release port to detachably connect to a corresponding shutter release port of said camera to allow more precise triggering of said camera, wherein said detachable connection is distinct and separate from other types of connections, including but not limited to Firewire, USB, or Cat5, and distinct and separate from the PTP protocol.

4. The apparatus of claim 1 wherein said camera accessory is either attached or housed with one or more of pan, tilt and rotation motors to allow motion of said camera.

5. The apparatus of claim 1, wherein said wireless enabled device is configured to monitor, display, and adjust parameters and settings of said camera by use of said specific program which includes setting commands for said camera model and manufacturer, said settings and parameters include but are not limited to shutter speed, aperture, ISO, and focus settings, wherein said settings and parameters are obtained from said camera using Picture Transfer Protocol messages.

6. The apparatus of claim 1, wherein said specific program includes commands for focus stacking, comprising the automated process of capturing multiple images with varying focal planes achieved by commanding said camera to trigger image captures with one or more commands to adjust said camera's focal plane between each capture, where in a user of said wireless enabled device does not change the focal plane, said specific program automatically changes the focal plane.

7. The apparatus of claim 1, wherein said specific program includes commands for creating exposure bracketed sequences, comprising an automated sequence of commands comprising commands to trigger image captures on said camera with commands to adjust said camera's exposure through changing shutter speed, aperture, or ISO between each capture, a user of said wireless enabled device does not change shutter speed, aperture or ISO between the shots as said specific program automatically changes these values.

8. The apparatus of claim 1, wherein said specific program includes commands for Time Lapse, wherein said camera accessory is configured to perform an automated sequence of image capture commands according to a configured interval predetermined by a user on said wireless enabled device.

9. The apparatus of claim 1, wherein triggering of images from said camera is inputted from a user commands into said specific program on said wireless enabled device and said user commands are stored on said camera accessory, such that when said wireless enabled device is disconnected from said wireless local network, said user commands continue to be delivered to said camera.

10. The apparatus of claim 1 above, wherein said camera accessory is configured to communicate with multiple of said wireless enabled devices on a wireless local area network thus transferring images and/or live view from said camera to multiple of said wireless enabled devices.

11. The apparatus of claim 1 above, wherein multiple of said camera accessories are configured to communicate with one or more wireless enabled devices on the wireless local area network.

12. The apparatus of claim 1, wherein said wireless enabled device is configured to trigger image captures on said camera by use of said specific program and is further configured to view and/or save-said image onto said wireless enabled device.

13. The apparatus of claim 1, wherein by use of said specific program on said wireless enabled device, said wireless enabled device is configured to start and stop video recording and monitoring said recording through a live feed displayed on said wireless enabled device said user optionally can change focus during said video recording.

14. The apparatus of claim 13, by use of said specific program on said wireless enabled device, said wireless enabled device is configured to view a live feed from said camera on said wireless enabled device and make and display focus adjustments through the commands of Picture Transfer Protocol messages according to information provided within said live view.

15. A communication control method for a camera accessory, comprising the following steps in the sequence set forth:

Wherein steps (a) and (b) are followed sequentially by steps (c), (d) and (e) then followed by steps (f) and (g) where no preference is given to the respective order of (a) and (b) or respective order of (f) and (g);

(a) connecting a camera to a camera accessory through a USB protocol and USB electrical interface;

(b) wirelessly connecting a wireless enabled device to said camera accessory through the use of a wireless local area network;

(c) querying said camera for a camera model and camera manufacturer information;

(d) said wireless enabled device then determining the commands, parameters, values, and command sequences for said camera model from an existing library;

(e) then depending on said camera model commands are taken;

(f) controlling said camera through said wireless enabled device performing camera functions of changing camera parameters, triggering image captures, adjusting focus, and starting and/or stopping video recording through PTP protocol;

(g) displaying feedback on said wireless enabled device wherein said feedback includes camera parameter values, still images and related image data, live feed, and/or video recordings, wherein some of said camera models require only a specific camera parameter to be set before live view feed images can be retrieved, while other said camera models require a camera parameter to be set as well as a specific command issued before live view feed images can be retrieved.

16. The communication control method for said camera accessory of claim 15, wherein said steps (c), (d), and (e) above further comprises the configuration of said wireless enabled device to determine the appropriate commands, parameters, values, and command sequences appropriate for said camera model and manufacturer; wherein said step (c) above further comprises said wireless enabled device then determining the appropriate commands, parameters, values, and command sequences appropriate for said camera model from an existing database or library.

17. The communication control method for said camera accessory of claim 15, wherein said wireless enabled device is a smart phone, tablet or computer.

18. The communication control method for said camera accessory of claim 17, wherein said wireless enabled device is configured to monitor, display, and adjust parameters and settings of said camera by use of said specific program which includes setting commands for said camera model and manufacturer, said settings and parameters include shutter speed, aperture, ISO, and focus settings wherein said settings and parameter are obtained from said camera using Picture Transfer Protocol messages.

19. The communication control method for said camera accessory of claim 18, wherein the method further comprises: initiating a process of touch focusing on said wireless enabled device based on said camera model; 1) commanding said camera to set the location of interest to a selected area and then perform a focus operation; 2) determining the exact parameters and values based on prior information according to said camera model.

* * * * *